United States Patent Office 3,708,368
Patented Jan. 2, 1973

3,708,368
ARTICLE PROCESSING PROCESS WITH FEEDER SHUTTLE DISCONNECT
Donald W. Watson, Arlington Heights, Ill., assignor to Xerox Corporation, Rochester, N.Y.
Original application Nov. 2, 1968, Ser. No. 774,957, now Patent No. 3,614,088. Divided and this application Jan. 18, 1971, Ser. No. 107,532
Int. Cl. B65c 1/02
U.S. Cl. 156—300               2 Claims

ABSTRACT OF THE DISCLOSURE

A driving apparatus for shuttle type article feeders, the apparatus including a latch mechanism adapted to couple the shuttle with a reciprocating driving element, abutment means selectively interposed in the path of movement of the latch mechanism and contactable with an operating arm of the latch mechanism to cause release of the latch mechanism and uncoupling of the shuttle, means to restrain the shuttle against movement when uncoupled, and control means limiting uncoupling of the shuttle to a predetermined shuttle operating position.

---

This is a division of application Ser. No. 774,957, filed Nov. 12, 1968, now U.S. Pat. 3,614,088.

This invention relates to an article feeder, and more particularly, to a driving means for article feeders.

Article processing systems such as a system for labeling or addressing articles, for example, magazines, newspapers, etc., usually comprise a number of operating stations. For example, a labeling system includes an article source such as a printing machine, a machine to affix the labels or otherwise transfer the information thereon to the individual station for receiving and stacking the labeled articles, and transport means to move the articles throughout the system.

It is understood that the article processing speeds of the various stations or components that make up an article processing system must be compatible if integrated and efficient system operation is to be assured. In the aforementioned labeling system, mating the article source with the labeling machine is particularly critical. Usually an attempt is made to operate the labeling machine at the same speed as the article source. However, matching the article processing speeds of the article source with the labeling machine is difficult to accomplish, and constant attention is required to assure that the processing speeds remain equalized during system operation.

The potential article processing or labeling speed of present day labeling machines is normally in excess of the maximum speed at which articles can be generated by a single source, as for example, by a printing machine. This ability of the labeling machine to be operated at a greater speed than that of the article source presents a substantial advantage if use can be made thereof. For if the labeling machine is set to label articles faster than the speed at which articles to be labeled are generated by the article source, and the labeling machine is stopped and started in response to the supply of articles ready for labeling, the difficult job of trying to match the processing speeds of the article source with the labeling machine is avoided. Unfortunately, certain components of labeling machines, for example, the label transferring means, usually require an interval, once the machine is started, to reach operating condition, and this has heretofore effectively ruled out the possibility of mating the article source with the labeling machine through the exigency of operating the labeling machine at a higher speed than that of the article source and accommodating the speed differential through repeated stopping and starting of the labeling machine.

It is a principal object of the present invention to provide a new and improved article processing system and method of operation.

It is a further object of the present invention to provide an improved article processing system and method of operation in which the divergent article process rates of the article source and the processing machine, as for example a labeling machine, are accommodated without required matching of the individual article process rates one with the other.

It is a further object of the present invention to provide an article labeling system incorporating a high speed article labeling machine with means to uncouple the article feeder and interrupt the supply of articles to the labeling machine in accordance with predetermined system condition or conditions while maintaining the labeling machine in a ready or standby condition.

It is an object of the present invention to provide an article labeling mechanism in which the article labeling machine is arranged to label articles faster than articles can be supplied by the article source, and incorporating a disconnectable article feeder between the article source and the labeling machine with control means to selectively operate the article feeder in accordance with the supply of articles on hand.

It is an object of the present invention to provide an improved method for labeling articles.

This invention relates to an article processing system, the combination which comprises article processing means; means for transporting articles to be processed to the processing means; means for feeding articles to be processed to the transporting means; drive means; means for coupling the article feeding means with the drive means whereby to transfer articles to the transporting means for processing by the processing means; means adapted when actuated to release the coupling means and uncouple the feeding means whereby the transfer of articles to be processed to the transporting means is interrupted; and control means responsive to a predetermined system condition to actuate the release means.

This invention further relates to a method of labeling articles, the steps which consist of; supplying articles to be labeled to a first location where a supply of the articles may be accumulated; feeding articles singly from the accumulated article supply to a second location faster than articles to be labeled can be supplied whereby the supply of articles accumulated at the first location diminishes; labeling articles at the second location; terminating the feeding of articles to be labeled from the first location to the second location when the supply of articles at the first location reaches a predetermined minimum while marking time at the second location; and resuming feeding and labeling of articles when the supply of articles accumulated at the first location increases to a predetermined maximum.

Other objects and advantages will be apparent from the ensuing description and drawings in which:

FIG. 4 is a front view of the feeder driving means shown in FIG. 2;

Figure 1:
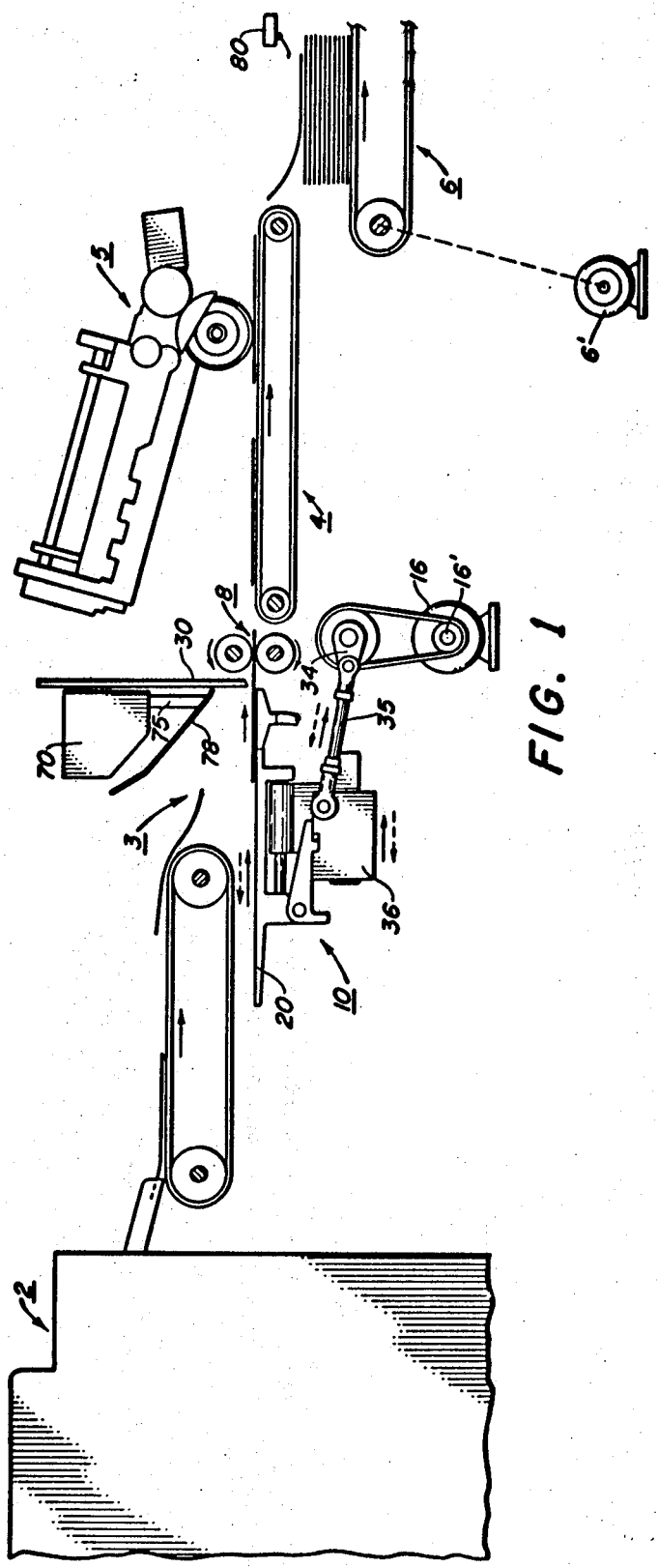
FIG. 1 is a schematic view showing an article processing system incorporating the article feeder driving means of the present invention.

Referring to the drawings, there is shown the feeder driving means, designated generally by the numeral 10, of the present invention. As will appear, driving means 10 enables an article feeder 3 to be readily uncoupled from motor 16 when it is desired to interrupt the feed of articles. In the exemplary arrangement, article feeder 3 comprises a reciprocating type feeding shuttle 20 adapted to feed articles forward to transport 4 serving a labeling machine 5. Other types of article feeders may, however, be readily contemplated.

To facilitate explanation, article feeder 3 is illustrated as supplying articles such as magazines, newspapers, sheets, etc. from a suitable finishing machine such as printing press 2 to article transport 4 and labeling machine 5. Other types of finishing machines such as envelope sealers, postage meter printers, wrapping machines, etc. may be contemplated. The labeled articles leaving labeling machine 5 are suitably disposed of as by stacking on discharge conveyor 6. Other devices for handling labeled articles such as sorting machines, wrapping machines, trimming machines, etc., may be contemplated. As is understood by those skilled in the art, labeling machine 5 normally incorporates a plurality of operating stations where the several functions necessary to transfer the label information to the articles are carried out. For example, labeling machine 5 may include a cutting station for cutting a continuous web of labels fed thereto into individual labels for application to the articles, a glue station for applying adhesive to the labels, and a transfer station for applying labels to the individual articles. Article transport 4 serves to bring the articles, in seriatim, into operative relationship with labeling machine 5. Preferably, the drive requirements for transport 4 and for the operating stations of labeling machine 5 are met by motor 16.

As will appear, the feeder driving means 10 of the present invention facilitates control of labeling machine 5 and of the article processing system itself in response to operating conditions upstream of and/or downstream of labeling machine 5. More particularly, feeder driving means 10, which enables article feeder 3, transport 4, and labeling machine 5 to be operated at a processing rate or speed slightly greater than that of the finishing machine, printing press 2, by permitting ready stopping and starting of article feeder 3 without shutdown of labeling machine 5, avoids the problem of trying to match or equalize the article processing rate of printing press 2 with that of labeling machine 5. Similarly, feeder driving means 10, by permitting the supply of articles to labeling machine 5 to be interrupted as when conveyor 6 is indexed without shutdown of the article supply means, printing press 2, obviates article jams, mis-timing, etc. as may occur where articles are continually supplied to a moving albeit non-feeding article feeding shuttle.

To prevent loss of label information, suitable means such as a photocell actuated control (not shown) are preferably provided to interrupt the supply of labels to the transfer station of labeling machine 5 whenever the supply of articles to be labeled thereto is exhausted following uncoupling of shuttle 20.

Figure 2:
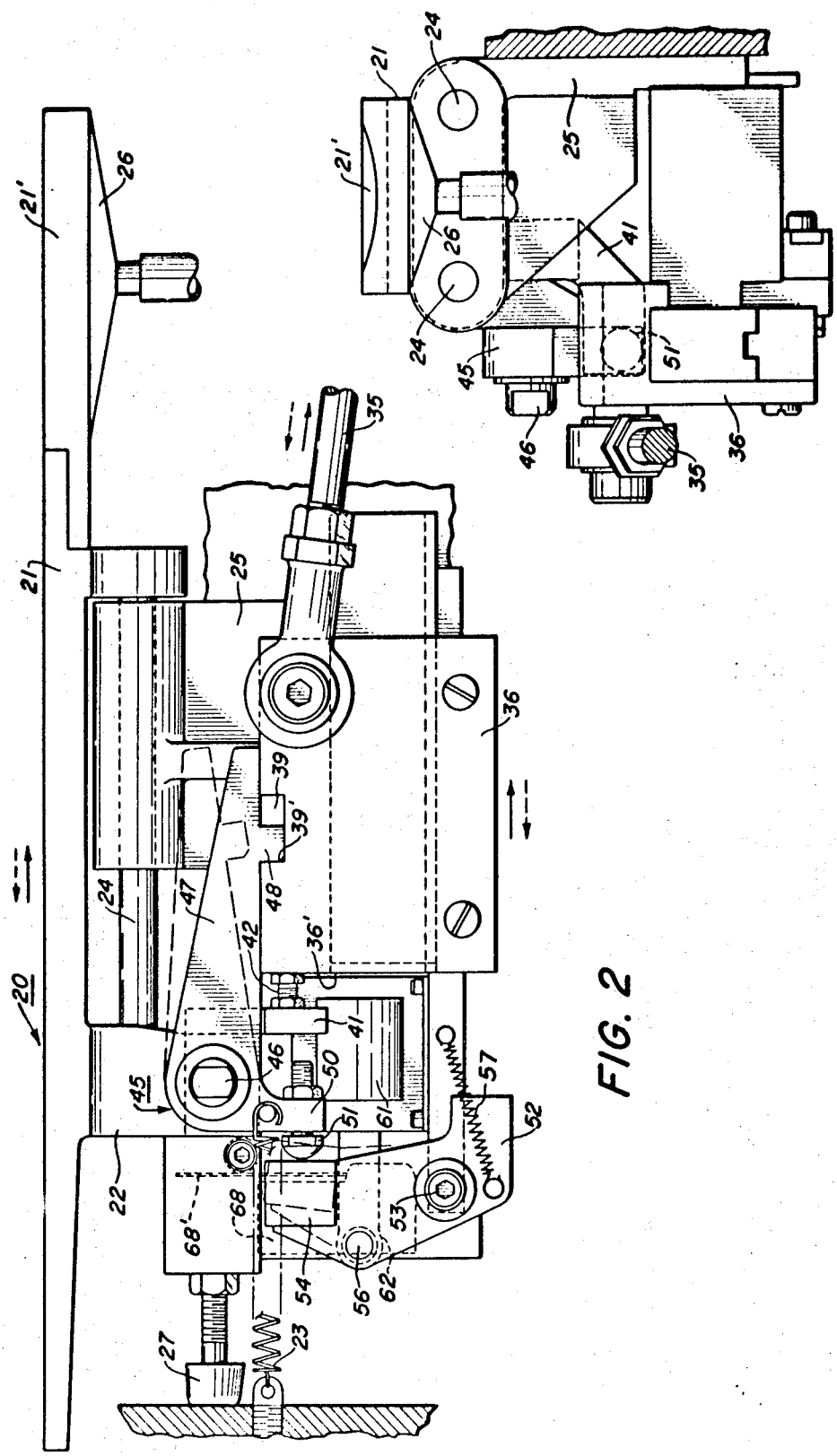
FIG. 2 is a side view partially in section showing the article feeder driving means of the present invention.
Figure 3:
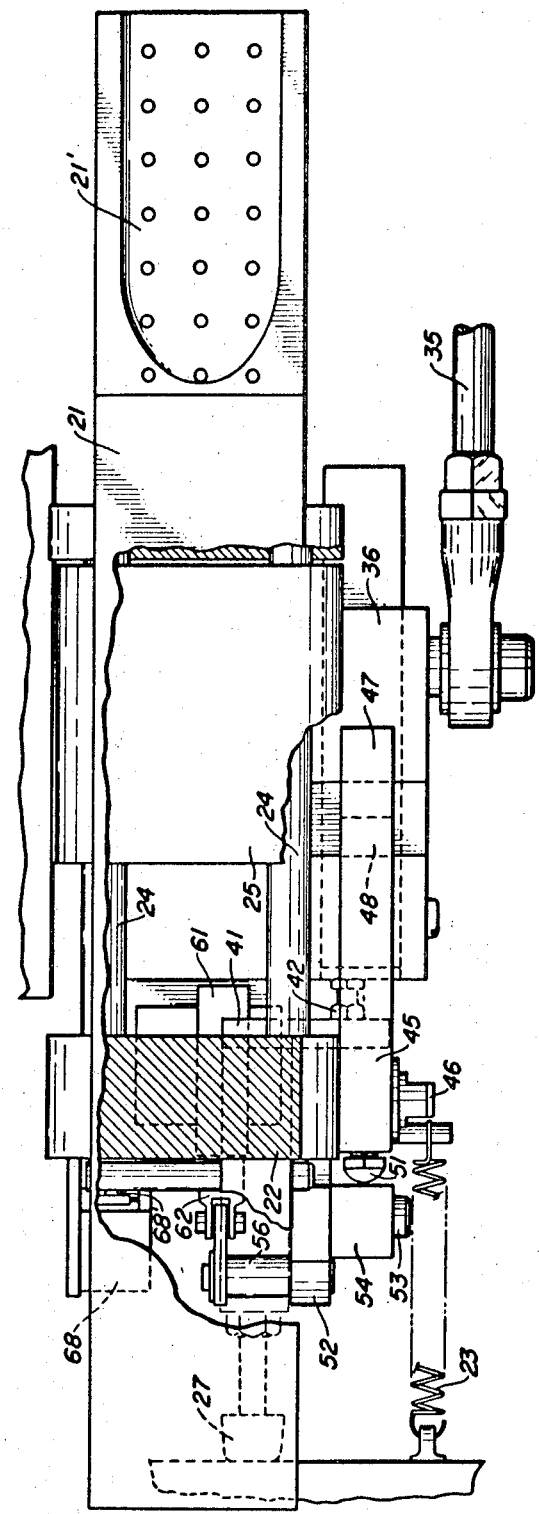
FIG. 3 is a top plan view of the feeder driving means shown in FIG. 2.

Referring particularly to FIGS. 2, 3 and 4 of the drawings, shuttle 20 of article feeder 3 comprises a plate-like part 21 having a perforated segment 21' adjacent the forward or discharge end thereof. Base 22 of plate 21 is slidably journaled for reciprocating movement by rods 24. Rods 24 are suitably supported on frame 25. Spring 23 serves to bias shuttle 20 in the return direction. An adjustable bumper 27 is provided to limit return movement of shuttle 20. As will appear, articles to be fed rest on plate 21 of shuttle 20 and are carried forward by shuttle 20 into the nip of pinch roll pair 8, which may be driven from motor 16 by suitable means (not shown), and onto transport 4.

The perforated segment 21' of shuttle plate 21 communicates through control valve 26 with a suitable source of vacuum (not shown). As is understood by those skilled in the art, valve 26 serves to selectively communicate segment 21' of shuttle plate 21 with the vacuum source on the forward or feed stroke of shuttle 20 (the direction shown by the solid line arrow of FIG. 2) whereby the bottommost article resting on shuttle plate 21 is carried forward. On the return stroke of shuttle 20 (the direction shown by the dotted line arrow of FIG. 2), valve 26 is closed to terminate the vacuum supply to segment 21' of shuttle plate 21.

To limit the number of articles fed by shuttle 20, a discharge gate 30 is spaced above shuttle plate 21 adjacent the discharge side thereof. As will be understood, gate 30 cooperates with shuttle plate 21 to limit the number of articles which may be carried forward with each stroke of shuttle 20. Preferably, gate 30 is adjusted to permit shuttle 20 to carry one article at a time forward to transport 4.

Shaft 16' of motor 16 carries eccentric 34. Crank arm 35 is pinned to eccentric 34 and shuttle driving slider 36. Eccentric 34, on rotation of motor shaft 16', reciprocates slider 36.

Slider 36 comprises a block-like part suitably journaled for reciprocating motion on frame 25. Slider 36, which is disposed below shuttle 20, is provided with a recess 39 in the upper surface thereof. Base 22 of shuttle 20 has a drive arm 41 depending therefrom into the path of movement of slider 36. An adjustable stop 42 is preferably provided on wall 36' of slider 36. As will appear, stop 42 of slider 36, on the return stroke thereof (as shown by the dotted line arrow of FIG. 1) engages shuttle drive arm 41 to return shuttle 20 to the start position.

A substantially L-shaped latch member 45 is pivotally secured to base 21 of shuttle 20 as by pin 46. One leg 47 of member 45 projects toward driving slider 36, downwardly projecting drive lug 48 thereof being adapted to seat within recess 39 of slider 36. As will appear, recess 39 is slightly larger than lug 48. The remaining leg 50 of latch member 45 extends downwardly, the terminal end thereof being opposite release abutment 54. An adjustable stop 51 is provided on leg 50 of latch member 45. As will appear, actuation of release solenoid 61 moves abutment 54 forward so that on return movement of shuttle plate 21 (in the direction of the dotted line arrow), stop 51 on leg 50 of latch member 45 engages abutment 54 to swing latch number in a counter-clockwise direction and lift drive lug 48 from recess 39 in slider 36.

With latch member 45 in the solid line position, drive lug 48 is disposed within recess 39 of slider 36. During the forward stroke of slider 36 (in the direction of the solid line arrow), the inner wall 39' of recess 39 engages drive lug 48 of latch member 45 to move shuttle 20 forward in an article feeding direction (the direction shown by the solid line arrow). On the return stroke of slider 36, abutment 42 engages drive arm 41 to return shuttle 20 to the start position. Abutment 42 of slider 36 is preferably adjusted to engage shuttle drive arm 41 following a slight degree of free movement of slider 36 to the left as seen in FIG. 2 following reversing of slider 36. This small degree of lost motion occurring in the transfer of drive to shuttle 20 from latch member 45 to drive arm 41 relieves pressures on drive lug 48 of latch member 45 to facilitate lifting of lug 48 from recess 39.

To disengage latch member 45, release lever 52 is provided. Lever 52, which is pivotally supported on frame 25 by pin 53 adjacent latch member 45, has abutment 54 thereof disposed opposite stop 51 on leg 50 of latch member 45. Rotation of lever 52 in a clockwise direction to the dotted line position shown in FIG. 2 moves abutment 54 thereof into the path of movement of stop 51 so that on return movement of shuttle 20, stop 51 strikes abutment 54 to pivot latch member 45 in a counterclockwise direction and lift drive lug 48 out of recess 39 in slider 36.

Movement of release lever 52 is effected by a solenoid 61 having an armature 62 pinned to release lever 52 at 56. As may be understood, actuation of solenoid 61 retracts armature 62 to rotate release lever 52 in a clockwise direction to the dotted line position whereby abutment 54 thereof is disposed in the path of movement of latch member 45. Spring 57 biases release lever 52 in the return or counter-clockwise direction.

Figure 5:
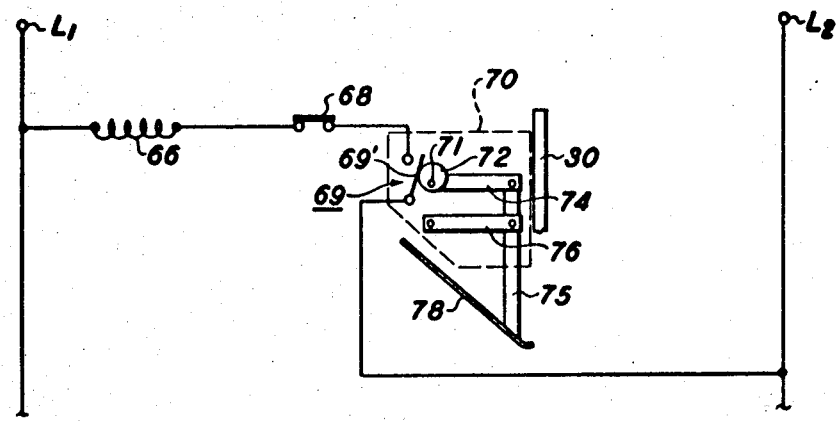
FIG. 5 is a view showing the control means for the feeder driving means of the present invention.

Referring to FIG. 5 of the drawings, operating coil 66 for solenoid 61 is connected through control switches 68, 69 across a suitable source of electrical power, designated for convenience by leads $L_1$, $L_2$. Switches 68, 69 are in series with one another, simultaneous closure thereof completing an energizing circuit to coil 66 of solenoid 61 to withdraw drive lug 48 and uncouple shuttle 20 as described heretofore.

Control switch 68, which is preferably normally opened, is supported on frame 25 proximate shuttle 20. Operating arm 68' of switch 68 is arranged in the path of return movement of shuttle plate 21, plate 21 engaging switch arm 68' to close switch 68 whenever shuttle 20 nears the start position. As will appear more fully, shuttle plate 21 is arranged to close control switch 68 slightly before the point at which stop 51 on latch member 45 would contact abutment 54 of release lever 52 when release lever 52 is in the forward position (the dotted line position shown in FIG. 2). On displacement of shuttle 20 in the forward or feeding direction, switch 68 is opened.

Control switch 69 responds to the supply of articles awaiting feeding on shuttle plate 21 and is supported within housing 70. Housing 70 is supported by frame 25 above shuttle 20 by suitable means (not shown) with housing 70 preferably disposed adjacent the inside wall of discharge gate 30. Preferably, housing 70 is arranged for limited raising and lowering movement to enable the response of control switch 69 to be adjusted.

A switch shaft 71 is rotatably journaled in housing 70 adjacent switch 69. Cam 72 on shaft 71 is disposed opposite arm 69' of switch 69, cam 72 serving to open and close switch 69 in response to predetermined rotation of shaft 71. Operating arm 74 projects from shaft 71 and has depending link 75 pinned to the terminal end thereof. Support arm 76 is rotatably mounted in housing 70 below arm 74, the axis of rotation of arm 76 being co-planar with that of shaft 71. Support arm 76 is pinned to link 75.

Link 75, which projects downwardly toward shuttle 20, terminates in an upwardly sloping shoe 78 adapted to rest on the topmost one of the articles awaiting feed on shuttle 20. Preferably, suitable spring means (not shown) are provided to bias link 75 and shoe 78 thereon in a downward direction.

In operation, articles to be labeled as from printing press 2, are fed onto shuttle plate 21 underneath the article sensing shoe 78 of control switch 69. Assuming there to be a supply of articles on shuttle plate 21, control switch 69 is opened and solenoid coil 66 is deenergized. Spring 57 accordingly holds release lever 52 retracted and abutment 54 thereof is withdrawn from the path of movement of stop 51 on leg 50 of latch member 45.

Drive lug 48 of latch member 45 is accordingly disposed in recess 39 of slider 36 which, during system operation, is continually reciprocated by means of eccentric 34. On the forward stroke of slider 36, shuttle 20 is coupled thereto by means of latch member 45 and shuttle 20 moves forward to feed the lowermost article resting on plate 21 thereof underneath discharge gate 30 and into the nip of pinch roll pair 8. Roll pair 8 feed the article onto transport 4 which brings the article into operative relationship with labeling machine 5 whereat a label or label information is applied in a manner known to those skilled in the art. From labeling machine 5, the labeled article is transported to discharge conveyor 6.

On the return stroke of driving slider 36, stop 42 thereof engages depending shuttle drive arm 41 to return shuttle 20 to the start position. As shuttle 20 nears the start position, control switch 68 is closed, it being understood that switch 78 is reopened with subsequent movement of shuttle 20 in the article feeding direction.

Inasmuch as the article processing speed of labeling machine is higher than that of the article producing means, printing press 2, the supply of articles to be labeled on shuttle plate 21 is reduced. Article responsive shoe 78, which rides upon the topmost article on shuttle plate 21, accordingly descends turning shaft 71 in a clockwise direction. When the supply of articles on shuttle plate 21 is temporarily exhausted or reaches a predetermined minimum as determined by the response setting of the actuating mechanism for control switch 69, cam 72 closes switch 69.

As described heretofore, control switch 68 is momentarily closed each time shuttle 20 nears the start position. Simultaneous closure of both control switches 68, 69 completes an energizing circuit to solenoid operating coil 66. Armature 62 of solenoid 61 accordingly rotates release lever 52 clockwise to place abutment 54 thereof in the path of movement of step 51 on leg 50 of latch member 45. As shuttle 20 moves nearer the start position, stop 51 contacts abutment 54 to rotate latch member 45 in a counter-clockwise direction and lift drive lug 48 from recess 39 in slider 36. With drive lug 48 disengaged from slider 36, shuttle 20 is stopped while slider 36 continues to reciprocate. Spring 23 holds shuttle 20 in the fully retracted position as determined by the setting of bumper 27 to prevent stop 42 of the reciprocating slider 36 from striking the now uncoupled shuttle 20.

Inasmuch as the article source, printing press 2, continues to furnish articles for labeling to article feeder 3, the supply of articles on shuttle plate 21 builds up lifting article responsive shoe 78 and turning shaft 71 counter-clockwise. It is understood that with shuttle plate 21 stationary and fully retracted, the possibility of misfeed or jamming of the articles feeding onto plate 21 is avoided or greatly minimized.

Following lifting of shoe 78 to a predetermined height, representing a predetermined supply of articles on shuttle plate 21, cam 72 opens control switch 69 to interrupt the energizing circuit to solenoid coil 66. With deenergization of coil 66, spring 57 retracts release lever 52 to withdraw abutment 54 thereof enabling drive lug 48 of latch member 45 to descend onto slider 36. Where recess 39 of the reciprocating slider 36 is opposite drive lug 48, lug 48 descends into recess 39 and drive to shuttle 20 is immediately resumed. Where recess 39 and the descending drive lug are out of phase, lug 48 rides on the surface of slider 36 until recess 39 thereof comes opposite lug 48 at which point lug 48 descends into recess 39 to resume driving of shuttle 20 in the manner described heretofore.

Figure 6:
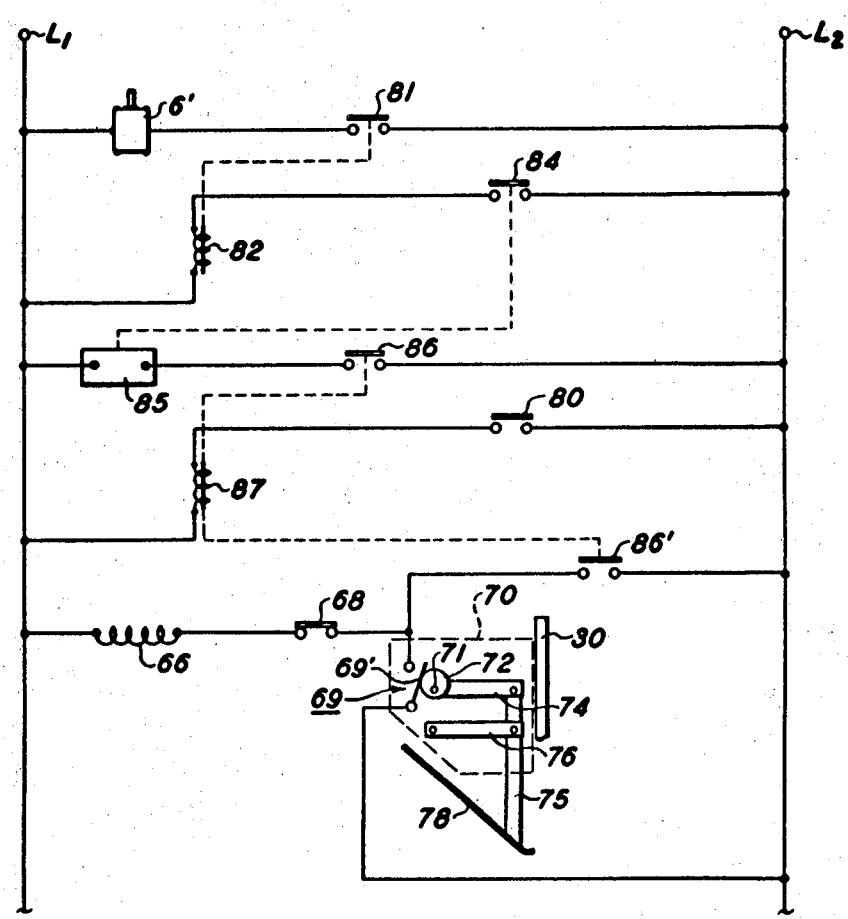
FIG. 6 is a view showing another type of control means for the feeder driving means of the present invention.

It is understood that where labeled articles are stacked, as by discharge conveyor 6, suitable controlling means, such as stack level responsive switch 80, may be provided. Referring particularly to FIG. 6 of the drawings where like numbers refer to like parts, discharge conveyor drive motor 6' is connected through relay contact 81 across leads $L_1$, $L_2$. Control relay 82 is connected through contact 84 of a suitable timing device 85 across leads $L_1$, $L_2$. Timing device 85 is connected through contact 86 of control relay 87 across leads $L_1$, $L_2$. Relay 87 is connected through stack level responsive switch 80 across leads $L_1$, $L_2$. A second contact 86' of relay 87 parallels control switch 69.

In operation, closure of switch 80 in response to a predetermined stack height energizes relay 87 closing contacts 86, 86' thereof. Closure of contact 86' readies the energizing circuit to solenoid operating coil 66 for operation, closure of control switch 68 energizing coil 66 to operate driving means 10 and uncouple shuttle 20 in the manner explained heretofore.

Closure of contact 86 energizes timing device 85 which serves, following an interval of time sufficient for articles remaining on transport 4 following stopping of shuttle 20 to be labeled and transported onto the stack of articles on conveyor 6, to close contact 84 thereof energizing control relay 82. Relay 82 closes contact 81 to complete an energizing circuit to motor 6' and start conveyor 6.

It is understood that suitable means (not shown) are provided to stop conveyor 6 and recouple shuttle 20 when removing of the stack of labeled articles is completed. Similar controlling arrangements for feeder driving means 10 may be envisioned for other types of labeled article handling devices. Additionally, other controlling means (not shown) may be provided to operate control switch 69 and uncouple shuttle 20 in response to a predetermined system malfunctions such as an article jam. Further, the feeder driving means 10 may be arranged to uncouple feeder shuttle 20 following movement of shuttle 20 forward rather than when shuttle 20 is retracted.

While the invention has been described with reference to the structure disclosed herein, it is not confined to the details set forth; but is intended to cover such modifications, or changes as may come within the scope of the following claims.

What is claimed is:
1. In the method of labeling articles, the steps consisting of:
 (a) supplying articles to be labeled to a first location where a supply of said articles may be accumulated;
 (b) feeding articles singly from said accumulated article supply to a second location faster than articles to be labeled can be supplied whereby the supply of articles accumulated at said first location diminishes;
 (c) labeling articles at said second location;
 (d) terminating the feeding of articles to be labeled from said first location to said second location when the supply of articles at said first location reaches a predetermined minimum while marking time at said second location;
 (e) resuming steps (b) and (c) when the supply of articles accumulated at said first location increases to a predetermined maximum;
 (f) stacking labeled articles at a third location; and
 (g) terminating the feeding of articles to be labeled from first location to said second location to enable a completed stack of labeled articles at said third location to be removed while marking time at second location.

2. The article labeling method according to claim 1 including the steps of:
 (a) labeling any articles remaining at said second location following the step of terminating the feeding of articles to be labeled to said second locations; and
 (b) thereafter removing the completed stack of labeled articles from said third location.

References Cited
UNITED STATES PATENTS

| | | | |
|---|---|---|---|
| 3,480,503 | 11/1969 | Morrow | 156—351 |
| 3,245,682 | 4/1966 | Pfleger | 271—44 |
| 2,779,592 | 1/1957 | Hartman | 271—4 |
| 3,100,111 | 8/1963 | Eichorn | 271—36 |
| 3,291,010 | 12/1966 | Williamson | 214—6 |

ROBERT F. BURNETT, Primary Examiner

M. E. McCAMISH, Assistant Examiner

U.S. Cl. X.R.

156—351, 364, 368, 566, 568; 198—24; 214—6 D, 8.5 R; 271—4